(No Model.)

W. C. ENGEL.
FIFTH WHEEL.

No. 365,174. Patented June 21, 1887.

WITNESSES:
Otto Beyer
C. Sedgwick

INVENTOR:
W. C. Engel
Munn & Co
ATTORNEYS.

UNITED STATES PATENT OFFICE.

WILLIAM C. ENGEL, OF ASHLAND, PENNSYLVANIA.

FIFTH-WHEEL.

SPECIFICATION forming part of Letters Patent No. 365,174, dated June 21, 1887.

Application filed March 21, 1887. Serial No. 231,692. (No model.)

*To all whom it may concern:*

Be it known that I, WILLIAM C. ENGEL, of Ashland, in the county of Schuylkill and State of Pennsylvania, have invented a new and Improved Fifth-Wheel, of which the following is a full, clear, and exact description.

My invention relates to fifth-wheel couplings for vehicles, and has for its object to provide a simple, inexpensive, and efficient coupling of this character which will be self-adjusting without noise or excessive friction, to accommodate every possible range of motion of the vehicle running-gear or body when traveling over uneven roads.

The invention consists in certain novel features of construction and combination of parts of the fifth-wheel coupling and connections, all as hereinafter described and claimed.

Reference is to be had to the accompanying drawings, forming a part of this specification, in which similar letters of reference indicate corresponding parts in all the figures.

Figure 1:
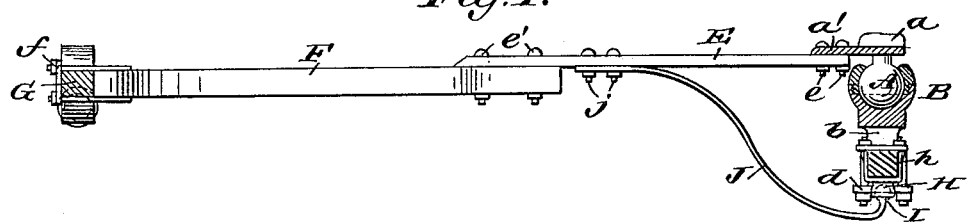
Figure 2:
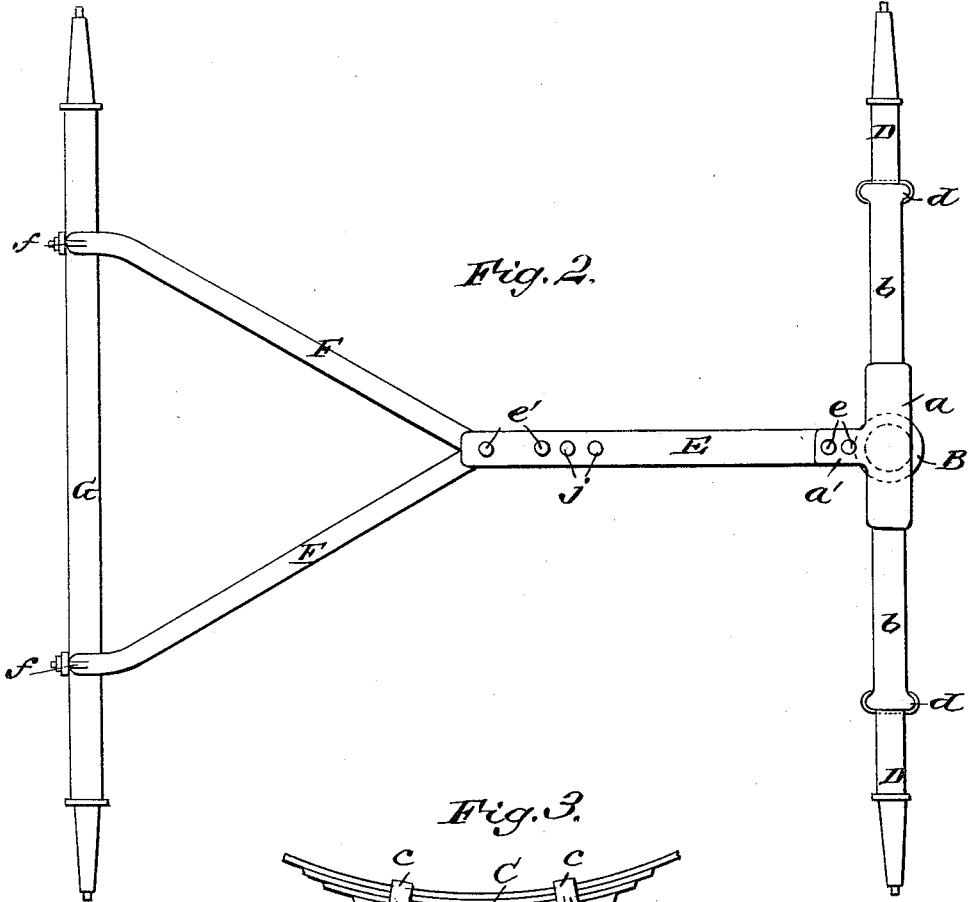
Figure 3:
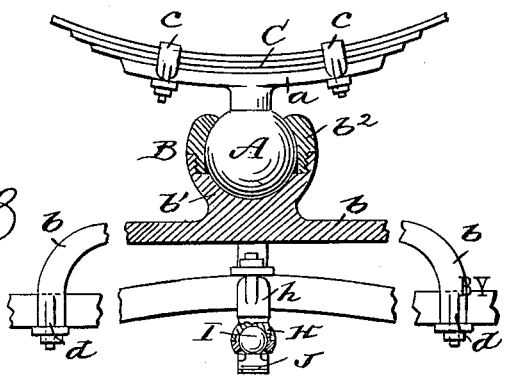

Figure 1 is a sectional side elevation of part of the running-gear of a vehicle, with my improved fifth-wheel applied as in use. Fig. 2 is a plan view of the running-gear; and Fig. 3 is a front view of the fifth-wheel and part of the vehicle-axle, and partly broken away.

The improved fifth-wheel consists, mainly, of a ball, A, having a connected head or flange-plate, a, to which the vehicle-spring may be clipped, and a socket, B, connected to a base plate or bar, b, clipped to the axle, and in which socket the ball A fits, after the manner of a ball-and-socket joint. I show the plate a held by ordinary clips, c c, to the lower part, C, of a spring, which may have any approved form and may be attached to the bed or body of a vehicle in any suitable way, and I show the base plate or bar b held by clips d, formed partly by forking the ends of the bar to the forward axle, D, of a vehicle, and the axle, like the spring, may have any approved form. The socket B is preferably made in two parts, one part, b', formed with or fixed to the base-plate b, and an upper part, b², which is preferably fitted to the part b' over the ball A by a screw-threaded joint, as shown in Figs. 1 and 3 of the drawings. The plate a on the ball A has a rearward extension, a', to which the forward end of the reach-bar E is bolted at e, and the rear end of the bar is connected rigidly by bolts e' with the rear reach-bars, F F, which diverge laterally and are clipped at f to the hind axle, G, of the vehicle. To the forward axle, D, a socket, H, is secured by suitable clips, h, and a ball, I, fixed to the forward end of a spring metal or elastic plate, J, is held in the socket H, preferably directly below the ball A of the upper ball-and-socket joint of the fifth-wheel coupling. The elastic plate J is bent upward and rearward, and is fastened at its back end by bolts j to the reach-bar E. A universal joint of any form may be substituted for the lower ball-and-socket joint, I H, if preferred. It is obvious that the ball and socket A B, forming the fifth-wheel, will have free movement upon or within each other to accommodate the various movements of the forward axle and wagon-body, and without straining the running-gear or body as the vehicle runs over uneven places in the road, and the lower elastic plate, J, with its ball-and-socket or universal joint I H, assists in maintaining true level of the vehicle-body, and also relieves the ball-and-socket fifth-wheel coupling A B of part of the strain which it would otherwise have to bear.

The fifth-wheel A B may be lubricated very easily by simply pouring oil onto the ball at its joint with the socket, and the oil will run into the socket and will thoroughly oil the coupling without waste of the lubricant and cause the fifth-wheel to adjust itself without noise and with very little friction.

This fifth-wheel coupling may be applied successfully to almost any style and size of vehicle with like good results.

Having thus fully described my invention, what I claim as new, and desire to secure by Letters Patent, is—

1. In a fifth-wheel, the plate a, having a rearward extension, a', and the depending ball A, the arched base-piece b, having a two-part socket, B, on its upper surface, receiving the ball, substantially as set forth.

2. A fifth-wheel consisting of a ball-and-socket coupling, A B, connecting the forward spring or parts of the upper running-gear of a vehicle with the forward axle, in combination with a ball-and-socket or universal coupling, I H, and an attached elastic plate, J, connecting the forward axle with the reach-bar of the vehicle, substantially as herein set forth.

3. The combination, with the reach E, the plate $a$, attached to the front end thereof, and having a ball, A, depending from the under side, the axle D, and the arched base $b$, clipped at its ends to the axle and having the socket consisting of the two sections $b'$ $b^2$, receiving the ball, of the socket H under the axle, and a plate or bar leading from the reach and having a ball, I, within the socket H, substantially as set forth.

4. In a fifth-wheel, the plate $a$, having a depending ball, A, and the base $b$, having the half-socket $b'$, formed integral with its upper surface and provided with screw-threads, and the upper half, $b^2$, screw-threaded to engage the threads on the lower half, substantially as set forth.

WILLIAM C. ENGEL.

Witnesses:
FRANK RENTZ,
I. B. SEIBERT.